US010836137B2

(12) United States Patent
Lin et al.

(10) Patent No.: US 10,836,137 B2
(45) Date of Patent: Nov. 17, 2020

(54) HOLEY GRAPHENE MESH AND SOLVENT-FREE MANUFACTURING AND COMPOSITES THEREOF

(71) Applicant: United States of America as represented by the Administrator of NASA, Washington, DC (US)

(72) Inventors: Yi Lin, Yorktown, VA (US); John W. Connell, Yorktown, VA (US); John W. Hopkins, Suffolk, VA (US); Brandon Moitoso, Oviedo, FL (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 48 days.

(21) Appl. No.: 16/040,627

(22) Filed: Jul. 20, 2018

(65) Prior Publication Data

US 2019/0022974 A1 Jan. 24, 2019

Related U.S. Application Data

(60) Provisional application No. 62/534,766, filed on Jul. 20, 2017.

(51) Int. Cl.
*B32B 9/00* (2006.01)
*C01B 32/194* (2017.01)
*B32B 3/26* (2006.01)
*B32B 5/26* (2006.01)
*B32B 5/02* (2006.01)

(52) U.S. Cl.
CPC ............ *B32B 9/007* (2013.01); *C01B 32/194* (2017.08); *B32B 2264/105* (2013.01); *B32B 2305/026* (2013.01); *B32B 2305/38* (2013.01); *B32B 2311/06* (2013.01); *B32B 2311/18* (2013.01); *B32B 2311/30* (2013.01);
(Continued)

(58) Field of Classification Search
CPC . B32B 9/007; B32B 2457/10; B32B 2311/18; B32B 2311/30; B32B 2311/06; B32B 2264/105; B32B 2457/16; B32B 2305/38; B32B 2305/026; C01B 32/194; C01B 2204/22; C01P 2004/03
See application file for complete search history.

(56) References Cited

U.S. PATENT DOCUMENTS

2013/0315816 A1* 11/2013 Watson ................. C01B 32/168
423/448
2015/0104372 A1* 4/2015 Lin ....................... C01B 32/194
423/460

* cited by examiner

*Primary Examiner* — Andrew J. Oyer
(74) *Attorney, Agent, or Firm* — Jennifer L. Riley; Robin W. Edwards; Helen M. Galus

(57) ABSTRACT

Systems, methods, and devices of the various embodiments provide for the creation of holey graphene meshes (HGMs) and composite articles including HGMs. Various embodiments provide solvent-free methods for creating arrays of holes on holey graphene-based articles formed from dry compression (such as films, discs, pellets), thereby resulting in a HGM. In further embodiments, a HGM can used as part of a composite, such as by: 1) embedding a HGM into another matrix material such as carbon, polymer, metals, metal oxides, etc; and/or (2) the HGM serving as a matrix by filling the holes of the HGM or functionalizing the HGM body with another one or more materials. In various embodiments, HGM can also be made as a composite itself by creating holes on dry-compressed articles pre-embedded with one or more other materials.

8 Claims, 10 Drawing Sheets

(52) U.S. Cl.
CPC ....... *B32B 2457/10* (2013.01); *B32B 2457/16* (2013.01); *C01B 2204/22* (2013.01); *C01P 2004/03* (2013.01)

HOLEY GRAPHENE MESH AND SOLVENT-FREE MANUFACTURING AND COMPOSITES THEREOF

CROSS-REFERENCE TO RELATED PATENT APPLICATION(S)

This patent application claims the benefit of priority to U.S. Provisional Patent Application No. 62/534,766, filed on Jul. 20, 2017, the contents of which is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Previously, atomically thin graphene sheets used as electrodes had a tendency to restack due to strong intersheet van der Waals forces, thus the typical through-thickness molecular transport paths were highly torturous and the available active surface area was consequently poor. Previous efforts to manufacture graphene-based energy storage electrodes had been focused on the manipulation of the micropores (nanometer scale) and the mesopores (sub-100 nm scale) in the graphene, where spacers were used or pores were generated between individual graphene sheets to improve accessible surface area. Previous efforts have also focused on the use of holey graphene whose in-plane nanometer-sized pores facilitate through-plane ionic transport. However, many advanced energy storage mechanisms require high rate performance, and these previous technical approaches to achieve through-thickness transport have proven insufficient.

There are also needs in some energy storage systems for facile diffusion and interactions of multiple components in different phases (gas-liquid-solid), for which unimpeded fluidic transport would be preferred. For example, in lithium-air batteries, the cathodes should have large available surface area to allow the effective interaction and reaction between lithium ion (solution), oxygen (gas), and the conductive substrate support (solid); thus the presence of nanoscale in-plane holes and between-plane pores in previous technical approaches renders these previous efforts insufficient and prevents realization of the theoretical energy potential.

BRIEF SUMMARY OF THE INVENTION

The systems, methods, and devices of the various embodiments provide for the creation of holey graphene meshes (HGMs) and composite articles including HGMs.

Various embodiments provide solvent-free methods for creating arrays of holes with lateral dimensions of 10 micrometers (μm) and above on holey graphene-based articles formed from dry compression (such as films, discs, pellets), thereby resulting in a HGM. A HGM can be enabled by the uniqueness in the dry compressibility of holey graphene and the processability of the dry-compressed monolithic articles, both of which are unavailable with pristine graphene. In further embodiments, a HGM can used as part of a composite, such as by: 1) embedding a HGM into another matrix material such as carbon, polymer, metals, metal oxides, etc; and/or (2) the HGM serving as a matrix by filling the holes of the HGM or functionalizing the HGM body with another one or more materials. In various embodiments, HGM can also be made as a composite itself by creating holes on dry-compressed articles pre-embedded with one or more other materials.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
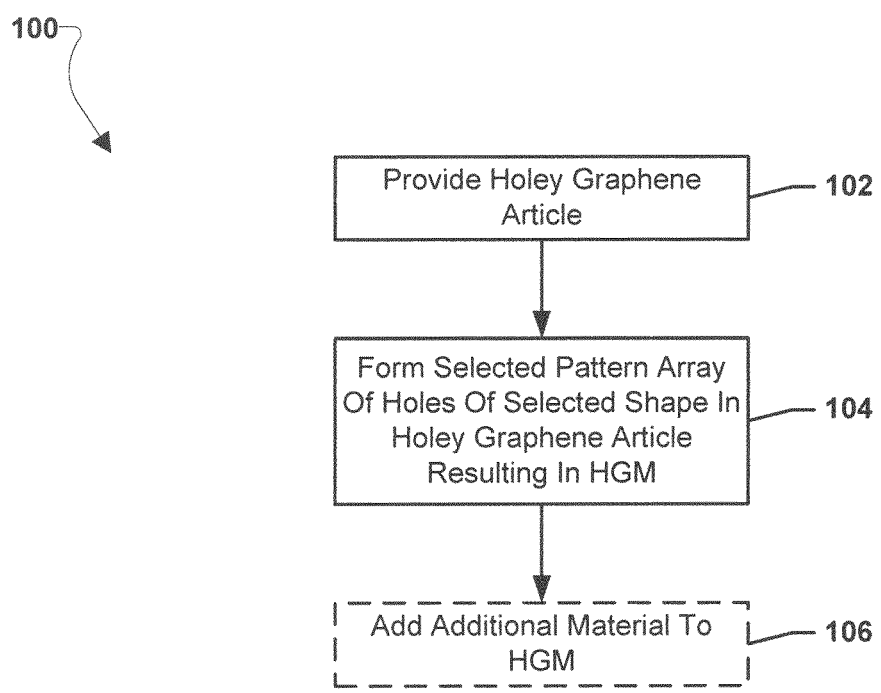
FIG. 1 is a process flow diagram illustrating an embodiment method for solvent-free manufacturing of an article including a holey graphene mesh (HGM).

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the various embodiments provide for the creation of holey graphene meshes (HGMs) and composite articles including HGMs.

Various embodiments provide solvent-free methods for creating arrays of holes with lateral dimensions of 10 micrometers (μm) and above on holey graphene-based articles formed from dry compression (such as films, discs, pellets), thereby resulting in a HGM. The holes can be partially, completely, or combinations of partially and completely drilled through the thickness of the holey graphene-based articles. A HGM can be enabled by the uniqueness in the dry compressibility of holey graphene and the processability of the dry-compressed monolithic articles, both of which are unavailable with pristine graphene. In further embodiments, a HGM can used as part of a composite, such as by: 1) embedding a HGM into another matrix material such as carbon, polymer, metals, metal oxides, etc; and/or (2) the HGM serving as a matrix by filling the holes of the HGM or functionalizing the HGM body with another one or more materials. As an example, a HGM can be used as part of a composite by being used as a scaffold or framework material to be embedded with carbon, silicon, polymers, metals (including lithium, sodium, potassium, magnesium, and various other metal anode materials), metal oxides, etc. In various embodiments, HGM can also be made as a composite itself by creating holes on dry-compressed articles pre-embedded with another one or more materials.

In various embodiments, HGMs can be used as components of graphene-based energy storage electrodes. The HGMs can enable graphene-based energy storage electrodes with improved through-thickness molecular transport while maintaining the electrode integrity. By creating micrometer-sized through thickness and/or partially through thickness pores (or holes) on holey graphene-based electrodes, a molecular transport "highway" can be created by HGMs of the various embodiments, and this transport can enable this tri-phase interface and thus the energy storage performance.

The various embodiments address various short-comings in previous graphene based manufacturing efforts. Various embodiments can provide advanced graphene based energy storage mechanisms with a high rate performance. Various embodiments can achieve through-thickness transport in the graphene sufficient to support energy storage mechanisms with a high rate performance. Various embodiments can provide graphene based energy storage mechanisms with facile diffusion and interactions of multiple components in different phases (gas-liquid-solid), for which unimpeded fluidic transport can be provided.

Various embodiments can enable the creation of advanced electrodes via practical, scalable and facile methods without the use of any solvent or acid. The absence of solvent or acid during processing according to the various embodiments can be environmentally benign, can reduce the number of processing steps, and can be less costly when compared with previous graphene manufacturing processes. The methods to obtain holey graphene mesh according to the various embodiments via solvent-free processes can be unique for holey graphene because pristine graphene is not compressible. The compressed holey graphene articles manufactured according to the various embodiments can be robust enough to allow the formation (e.g., via drilling, etc.) of arrays of holes (down to 10 μm or less) via processes such as mechanical puncture, laser ablation, and other high-energy and high-precision mechanical or energetic methods. While various embodiments are discussed herein without the use of any solvent or acid for the creation of the HGMs, this does not exclude the use of solvents or electrolytes to enhance material wetting of the created HGMs.

Various embodiments provide HGM based electrodes (e.g., HGM electrodes, HGM composite electrodes, etc.) for use in energy storage applications, such as in supercapacitors and in lithium-based batteries in the effort to scale up the electrodes while maximally retaining their electrochemical performance.

The HGMs and/or composites including HGMs of the various embodiments provide a nanocarbon-based architecture that: 1) can be prepared from dry processing from commercially available starting materials or readily prepared composites thereof; 2) can exhibit micropores and mesopores due to the holey graphene sheets (as well as the optional stacking of the holey graphene sheets); and 3) exhibits micron- and macro-sized pores in the article formed from the HGMs and/or composites including HGMs of the various embodiments.

The HGMs and/or composites including HGMs of the various embodiments can be robust enough to survive the hole drilling process. For example, the HGMs and/or composites including HGMs of the various embodiments can be robust enough to survive the hole drilling process with hole density (i.e., the ratio of hole area to total area) of at least 20%. As other examples, the HGMs and/or composites including HGMs of the various embodiments can be robust enough to survive the hole drilling process with hole densities from about 0% to greater than about 30%, such as hole densities from about 0% to about 0.2%, about 0.2% to about 2%, about 2% to about 10%, about 10% to about 30%, about 30% to about 50%, greater than about 50%, etc. The robustness for the starting holey graphene or composite article can impact the success of hole creation while enabling hole creation to not affect the integrity of the finished article.

The HGMs and/or composites including HGMs of the various embodiments can be created in an embodiment production process that can be solvent-free to minimize the environmental impact and the overall cost in the production. The HGMs and/or composites including HGMs of the various embodiments can be used to create products that include hierarchical levels of porosity, from micropores and mesopores from the holey graphene materials, as well as the micron- and macro-sized pores in the article provided by the mesh architecture.

The HGMs and/or composites including HGMs of the various embodiments provide the ability to fabricate very thick electrodes in which the ion transport distance through the plane of the electrode can be nearly equal in all directions.

The ability to fabricate the HGMs and/or composites including HGMs of the various embodiments can enable a variety or architectures that can be produced by stacking meshes of varying hole size and array patterns and by stacking dissimilar materials in a variety of arrangements to enable the achievement of near theoretical device performance.

Figure 2A:
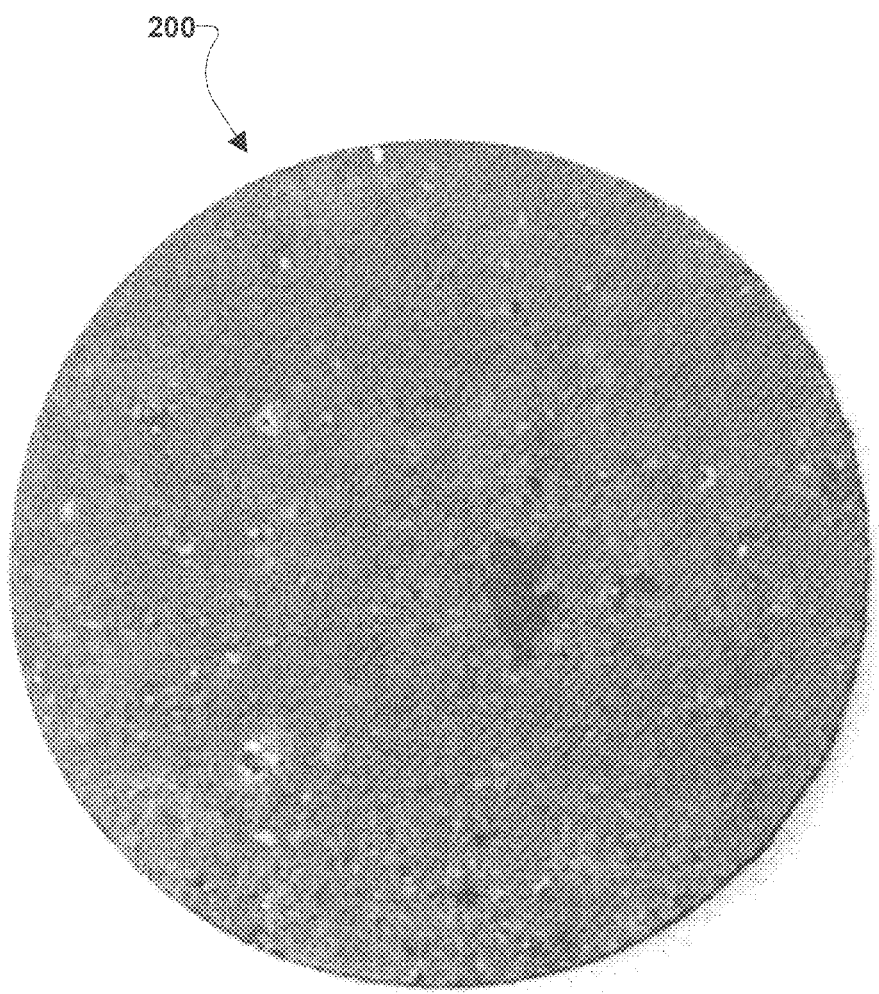
FIG. 2A is a photograph of a holey graphene pellet formed from dry compressing.

FIG. 1 is a process flow diagram illustrating an embodiment method 100 for solvent-free manufacturing of an article including a HGM. In step 102 a holey graphene article can be provided. The holey graphene article can be provided in any form, such as a sheet, pellet, etc. As a specific example, shown in FIG. 2A, the holey graphene article can be a holey graphene pellet formed from dry compressing. FIG. 2A illustrates a prepared holey graphene pellet 200 with a diameter of 15 millimeters (mm). In various embodiments, the holey graphene article can be an article formed entirely from holey graphene. In various embodiments, the holey graphene article can be an article formed of a mixture of holey graphene and any combination of one or more materials, such as carbon, polymer, metals (e.g. Ruthenium (Ru), Platinum (Pt), etc.), metal oxides (e.g., ferric oxide ($Fe_2O_3$), titanium dioxide ($TiO_2$), etc.), silicon, epoxy, etc. As a specific example, the holey graphene article provided in step 102 can be a Ru-holey graphene composite disc. In various embodiments, the holey graphene article can have any thickness, such as about 1 nm to about 2 nm, about 2 nm to about 50 nm, about 50 nm, about 50 nm to about 100 nm, about 100 nm, about 100 nm to about 1 µm, about 1 µm, about 1 µm to about 5 µm, about 5 µm, about 5 µm to about 10 µm, about 10 µm, about 10 µm to about 100 µm, about 100 µm, above about 100 µm, etc. As a specific example, the holey graphene article can have a thickness of about 100 µm.

Figure 2B:
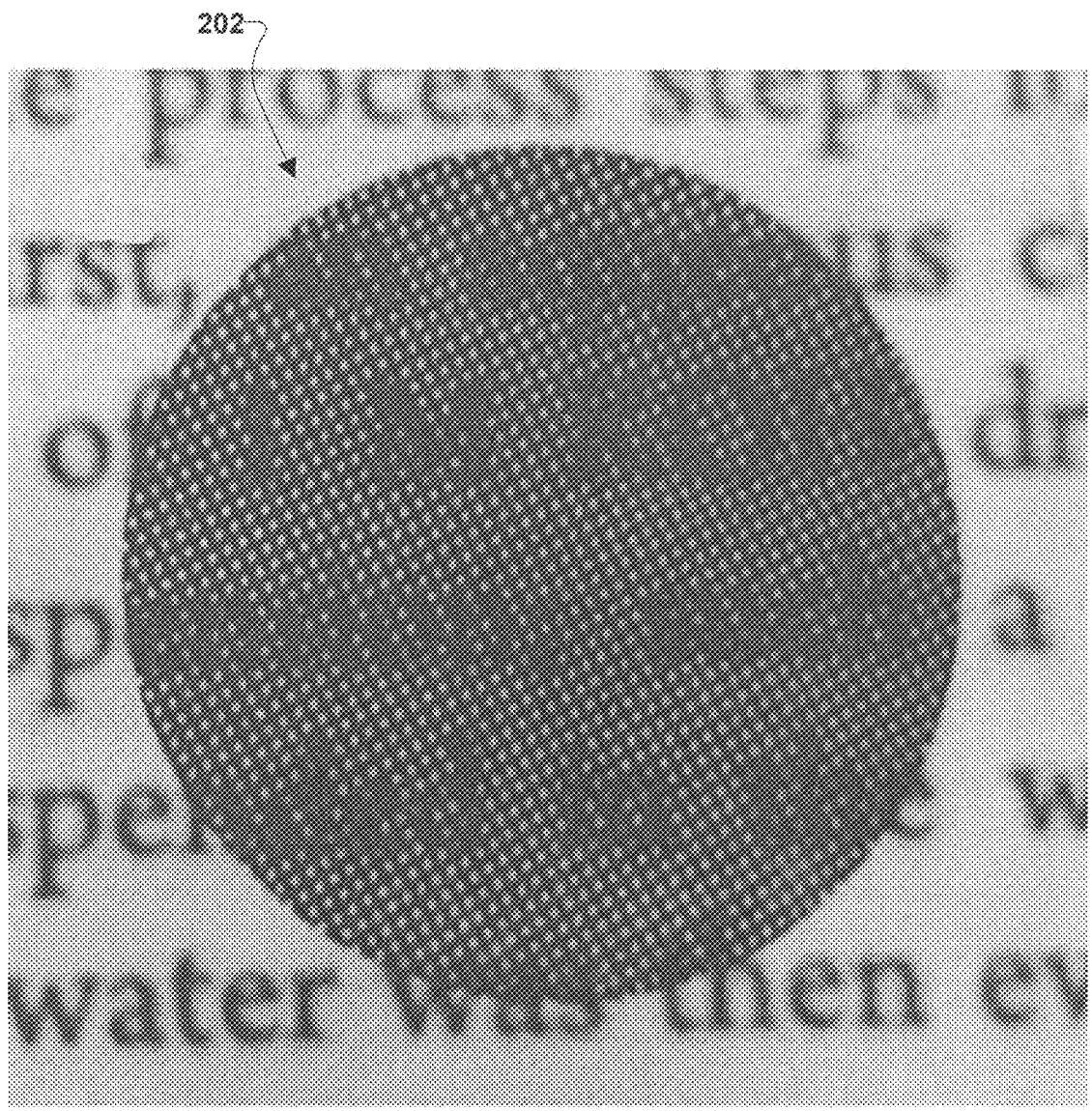
FIG. 2B is an embodiment HGM formed according to an embodiment method for solvent free manufacturing.

Referring back to FIG. 1, in step 104 a selected pattern array of holes of a selected shape can be formed in the holey graphene article resulting in a HGM. In various embodiments, the array of holes can be formed without the use of a solvent. As examples, the holes can be formed by drilling (e.g., laser hole drilling, etc.), mechanical puncture, laser ablation, and other high-energy and high-precision mechanical or energetic methods (e.g., thermal, mechanical, microwave, or other form of irradiation techniques used to form holes). In some embodiments, forming the holes does not change the thickness of the holey graphene article and in other embodiments, forming the holes can change the thickness of the holey graphene article. The selected pattern array of holes can be an array of any number of holes and the patterns can be any type patterns, such as symmetric, asymmetric, uniform, non-uniform, etc. patterns of holes. The size of the holes created in step 104 can be any size. As examples, the holes can have depths of below 1 nanometer (nm) to above 10 µm, such as about 1 nm to about 2 nm, about 2 nm, about 2 nm to about 50 nm, about 50 nm, about 50 nm to about 100 nm, about 100 nm, about 100 nm to about 1 µm, about 1 µm, about 1 µm to about 5 µm, about 5 µm, about 5 µm to about 10 µm, about 10 µm, about 10 µm to about 100 µm, about 100 µm, above about 100 µm, etc., the holes can have diameters of less than about 1 nanometer (nm) to greater than about 200 µm, such as about 1 nm to about 2 nm, about 2 nm, about 2 nm to about 50 nm, about 50 nm, about 50 nm to about 100 nm, about 100 nm, about 100 nm to about 1 µm, about 1 µm, about 1 µm to about 5 µm, about 5 µm, about 5 µm to about 10 µm, about 10 µm, about 10 µm to about 100 µm, about 100 µm, about 100 µm to about 115 µm, about 115 µm, about 115 µm to about 150 µm, about 150 µm, about 150 µm to about 200 µm, about 200 µm, above about 200 µm, etc., the holes can have a center-to-center hole distance of less than about 1 nanometer (nm) to greater than about 400 µm, such as about 1 nm to about 2 nm, about 2 nm, about 2 nm to about 50 nm, about 50 nm, about 50 nm to about 100 nm, about 100 nm, about 100 nm to about 1 µm, about 1 µm, about 1 µm to about 5 µm, about 5 µm, about 5 µm to about 10 µm, about 10 µm, about 10 µm to about 100 µm, about 100 µm, about 100 µm to about 115 µm, about 115 µm, about 115 µm to about 150 µm, about 150 µm, about 150 µm to about 200 µm, about 200 µm, about 200 µm to about 250 µm, about 250 µm to about 300 µm, about 300 µm, about 300 µm to about 350 µm, about 350 µm, about 350 µm to about 400 µm, about 400 µm, above about 400 µm, etc., and combinations of various ones of these example hole depths, hole diameters, and center-to-center hole distances can be used in the selected pattern array of holes in the various embodiments. In various embodiments, the hole depth can be equal to the thickness of the holey graphene article and in other embodiments the hole depth can be less than the thickness of the holey graphene article. In some embodiments, the hole depth of all holes in the selected pattern array of holes can be the same. In some embodiments, the hole depth of holes in the selected pattern array of holes can be different. In some embodiments, the hole depth can vary across the selected pattern array of holes. For example, some holes will completely penetrate the holey graphene article (i.e., have a hole depth equal to the thickness) and some holes will not completely penetrate the holey graphene article (i.e., have hole depths less than the thickness). In various embodiments, the hole density (i.e., the ratio of hole area to total area) of the selected pattern array can be any hole density, such as less than about 10%, about 10% to about 20%, about 20%, at least about 20%, about 20% to about 25%, about 25%, about 25% to about 50%, greater than about 50%, etc. The shape of the holes can be any shape, such as cylindrical, conical, cubic, hexagonal, complex non-symmetrical shapes, etc. As a specific example, a HGM can be produced with circular holes with diameters of about 114 µm and a center-to-center hole distance of about 310 µm. Laser drilling with laser conditions being a 355 nm Nd:YAG laser with a frequency of 40 kHz and power of 2 W and 10 circular drilling passes at each hole with targeted diameter of 100 µm can be used to create the specific example HGM. As other examples, various other laser powers (e.g., 0.8-2 W) and various other drilling passes (e.g., 2-10 passes) can be conducted to form a HGM of similar hole dimension and array patterns. FIG. 2B shows an embodiment HGM 202 formed by solvent free manufacturing from the as prepared holey graphene pellet 200 of FIG. 2A. The HGM 202 is shown in FIG. 2B on top of a piece of paper with printing on it to show the HGM 202's transparency. The diameter of the pellet 200 and HGM 202 is 15 mm.

Figure 6A:
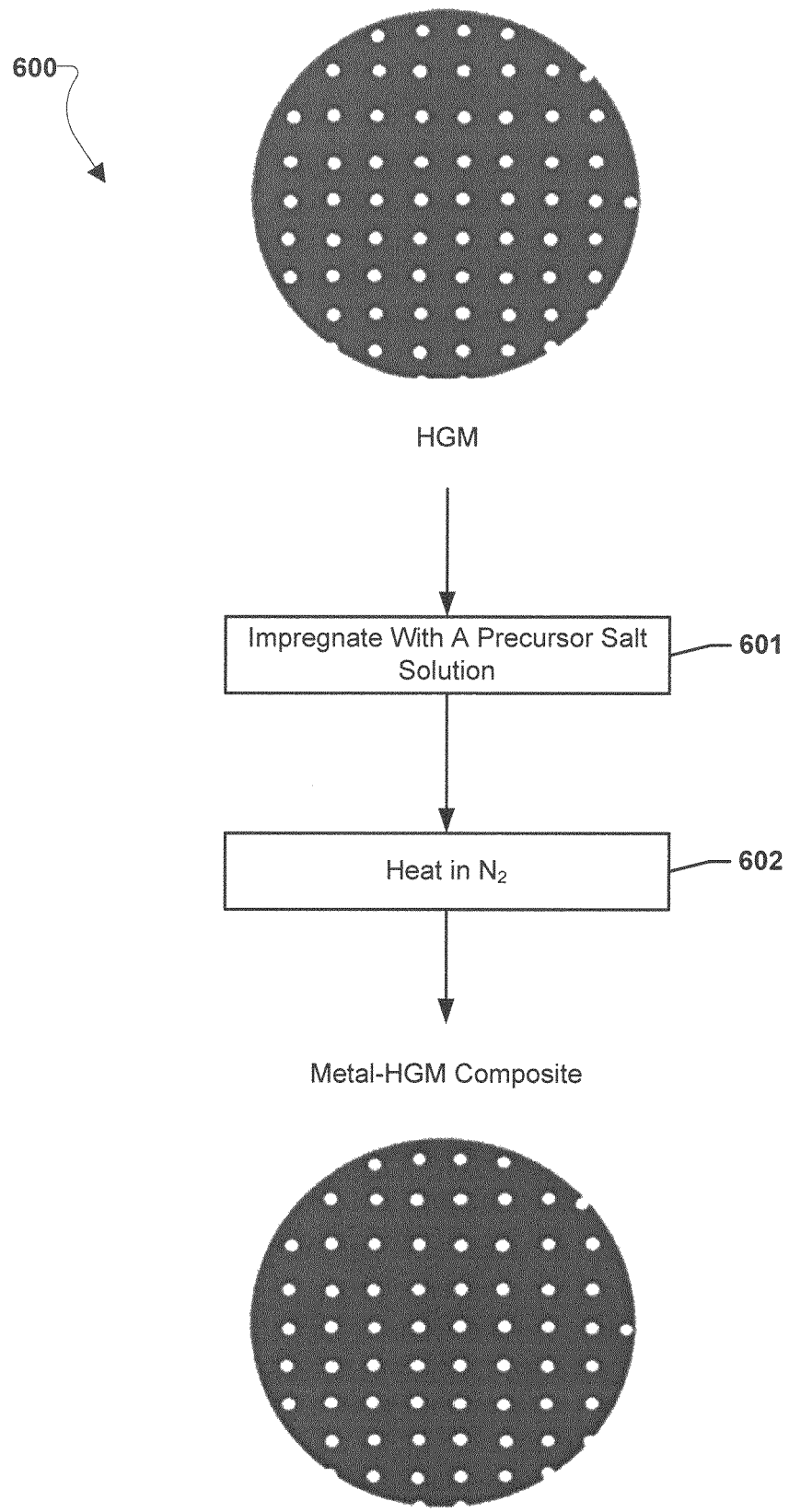
FIG. 6A is a schematic diagram of an embodiment method to prepare a metal/metal oxide-HGM composite from a HGM disc.

Referring back to FIG. 1, in an optional embodiment, one or more additional materials can be added to the HGM in optional step 106, thereby forming a composite HGM. The additional materials can be any combination of one or more materials, such as carbon, polymer, metals (e.g. Ru, Pt, etc.), metal oxides (e.g., $Fe_2O_3$, $TiO_2$, etc.), silicon, epoxy, etc. The additional materials can be any combination of one or more types of material, such as powders, liquids, gases, foam, etc. For example, a powder material can be placed onto the HGM and the HGM and powder can be pressed together to form an HGM composite. As a specific example, the HGM can be placed into a pressing die, followed by the addition of a Ru-based catalyst powder, and the entirety of the mixture can then be pressed by a hydraulic press at 4 tons for 15 min resulting in a Ru-HGM composite. As another specific example, the HGM can be soaked in a Ru salt precursor solution, followed by heating to 300° C. in nitrogen atmosphere resulting in a Ru-HGM composite as depicted in FIG. 6A.

In various embodiments, the I-GM or HGM composite formed by the steps of method 100 can then be used to form a portion of another article, such as an energy generation/storage device, electrical device, thermal device, optical device, biological device, etc. As examples, the HGM or HGM composite formed by the steps of method 100 can be used as a framework, matrix, or substrate in another article. In various embodiments, the HGM or HGM composite formed by the steps of method 1100 can be stacked with one or more other HGMs or HGM composites formed by the steps of method 100 as part of being used to form a portion of another article, prior to forming a portion of another article, and/or merely as part of forming a larger HGM or HGM composite without any relation to another article.

Figure 3A:
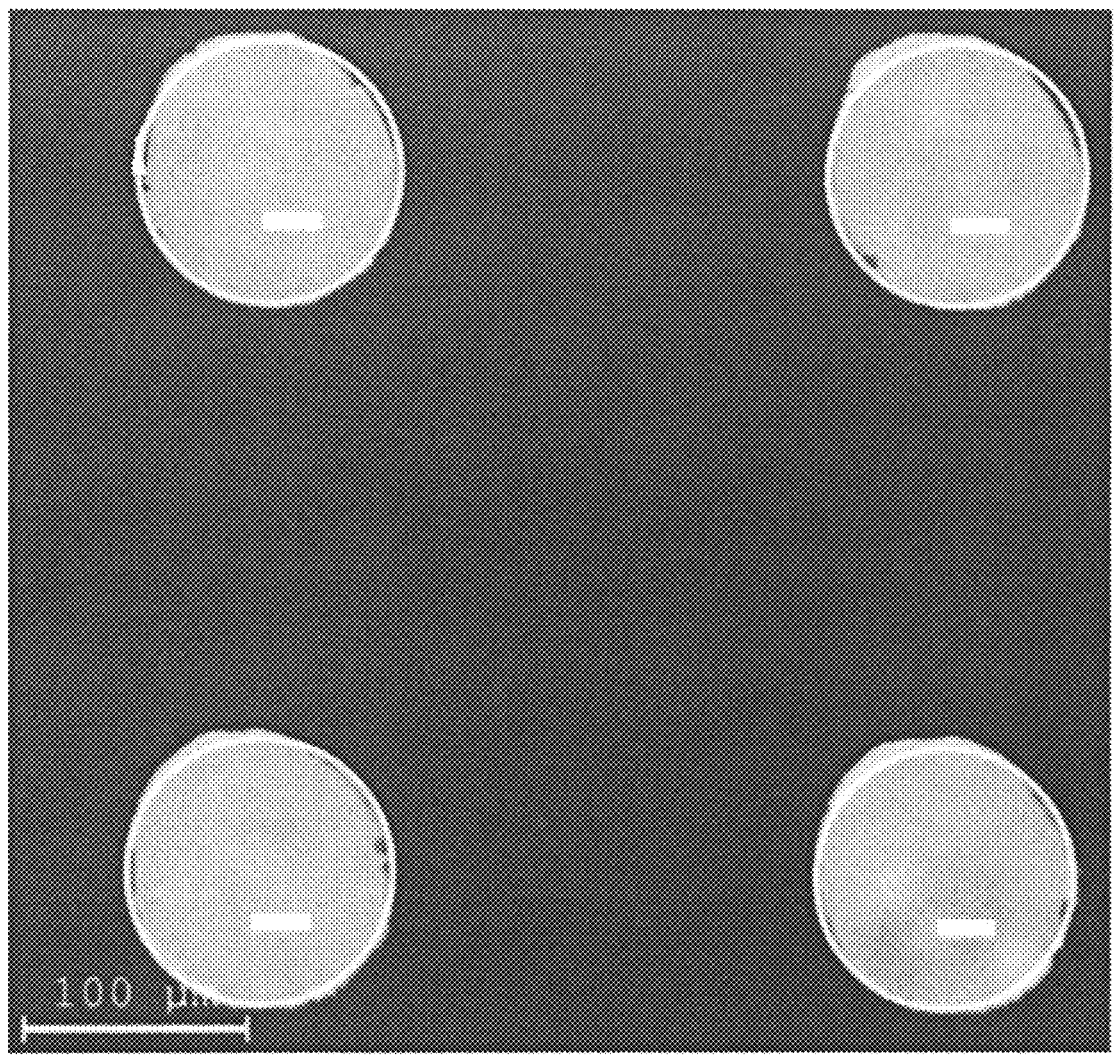
FIG. 3A is an optical micrograph showing the top view of a portion of the mesh of an embodiment HGM.
Figure 3B:
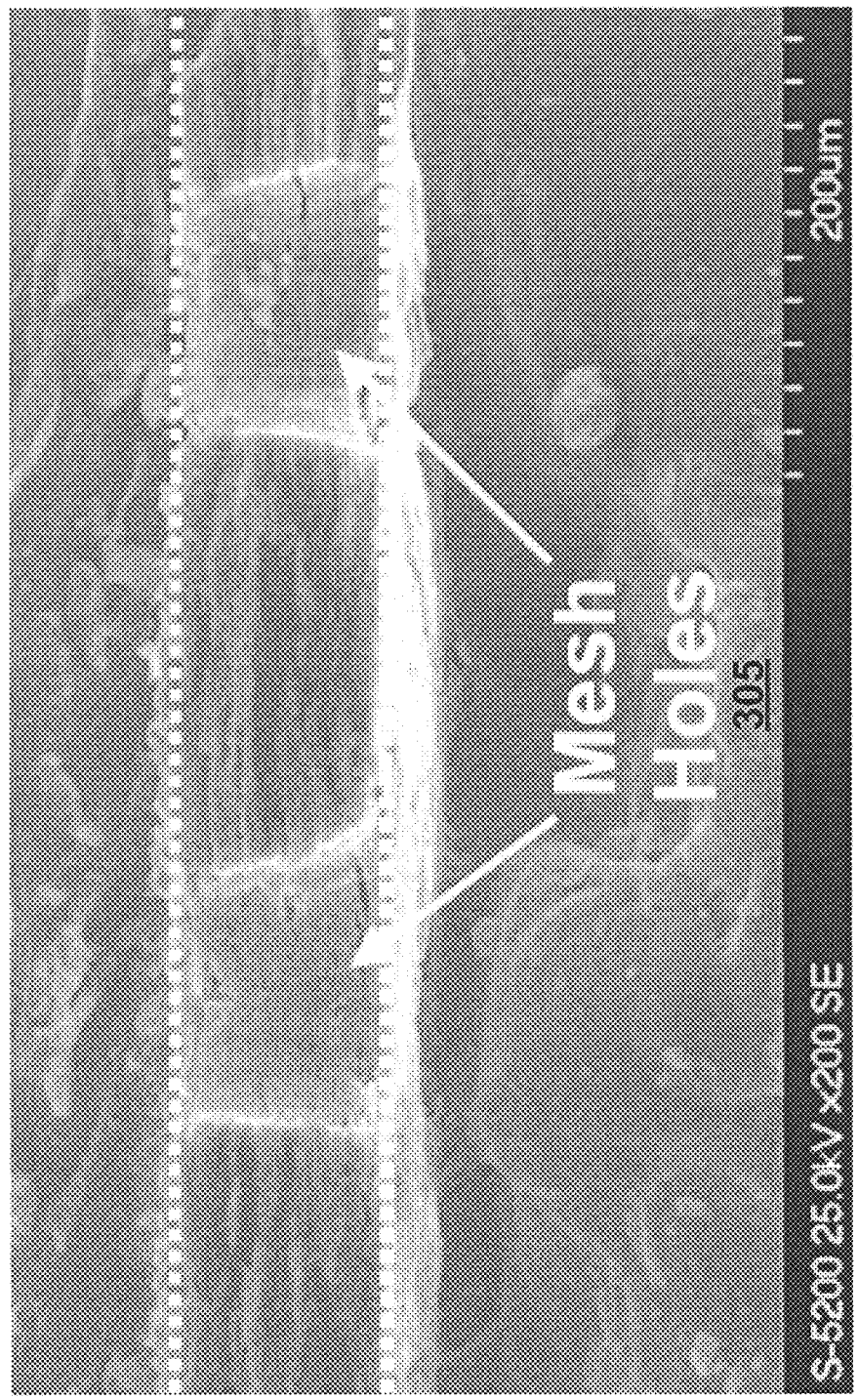
FIG. 3B is a scanning electron micrograph showing the cross-sectional view of a portion of the mesh of an embodiment HGM.
Figure 4:
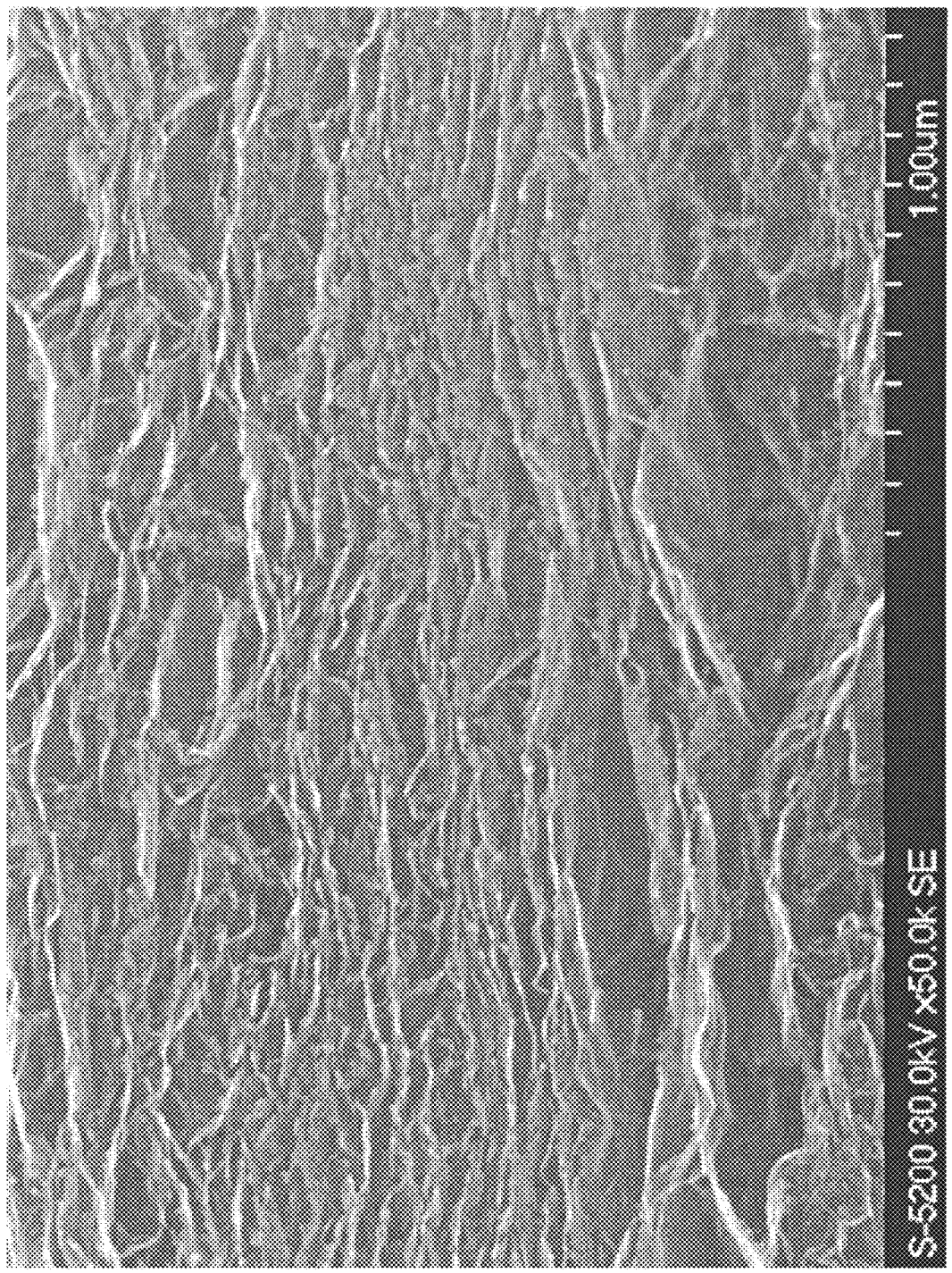
FIG. 4 is a scanning electron micrograph showing the cross section of a hole on an embodiment HGM.
Figure 5:
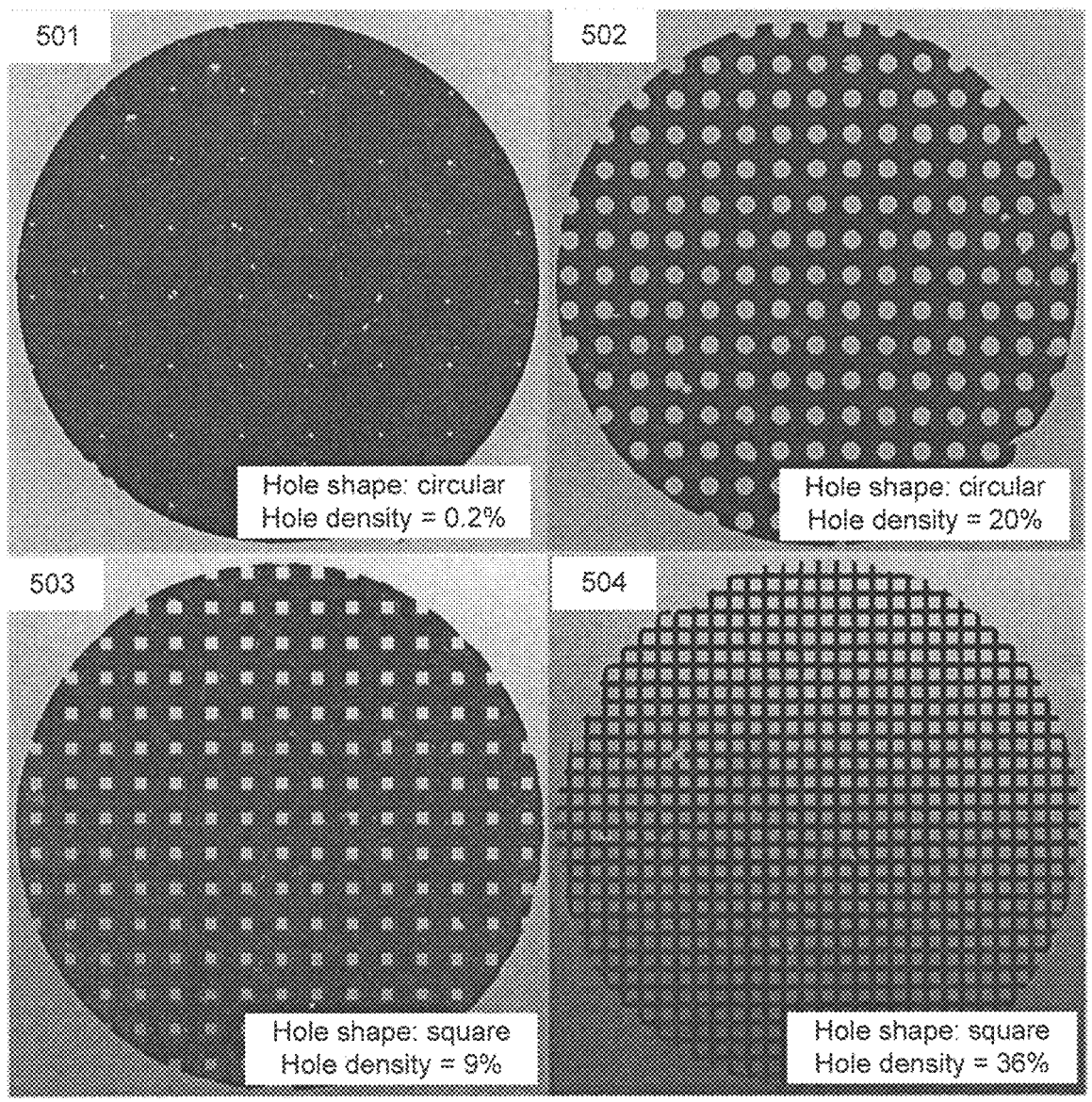
FIG. 5 shows photographs of HGM discs with different hole shapes and densities.

FIG. 3A is an optical micrograph showing the top view of a portion of the mesh of an embodiment HGM, such as an HGM formed by the steps of method 100. FIG. 3B is a scanning electron micrograph showing the cross-sectional view of a portion of the mesh of an embodiment HGM an illustrating the mesh holes 305. The upper and bottom surfaces of the mesh are highlighted in FIG. 3B are highlighted by the dashed lines. FIG. 4 is a scanning electron micrograph showing the cross section of a hole on an embodiment HGM where the layered graphene structure is preserved. FIG. 5 shows photographs of embodiment HGM discs 501, 502, 503, and 504 with different hole shapes and densities. HGM disc 501 has circular holes with a density of 0.2% (hole diameter=0.1 mm; hole-hole distance=2 mm). HGM disc 502 has circular holes with a density of 20% (hole diameter=0.5 mm; hole-hole distance=2 mm). HGM disc 503 has square-shaped holes with a density of 9% (hole sidelength=0.3 mm; hole-hole distance=1 mm). HGM disc 504 has square holes with a density of 36% (hole sidelength=0.3 mm; hole-hole distance=0.5 mm).

The embodiment methods, such as method 100, can produce a range of high fidelity hole size, shape, and distribution on the graphene or composite articles. The disclosed laser-based method is easily scaled-up and automatable. The result can be ultra-lightweight graphene-based mesh structures with high electrical conductivity, thermal conductivity, high surface area, high through-thickness unimpeded ion transport, mechanical robustness. The HGM-based composites can utilize HGM as a framework, matrix, or substrate for secondary components that are active for energy storage, catalysis, sensing, optical, filtration, and biological applications.

FIG. 6A is a schematic diagram of an embodiment method 600 to prepare a metal/metal oxide-HGM composite from a HGM disc. As an example, the steps of method 600 can be performed as part of step 106 of method 100 shown in FIG. 1 to form a composite HGM. In method 600 an HGM disc can be impregnated with a precursor salt solution, such as a Ru salt precursor solution, in step 601. In step 602 the impregnated HGM disc can be heated in a nitrogen ($N_2$) atmosphere, such as to 300° C., to for a metal-HGM composite. As a specific example, HGM can be soaked in a Ru salt precursor solution, followed by heating to 300° C. in a nitrogen atmosphere resulting in a Ru-HGM composite.

Figure 6B:
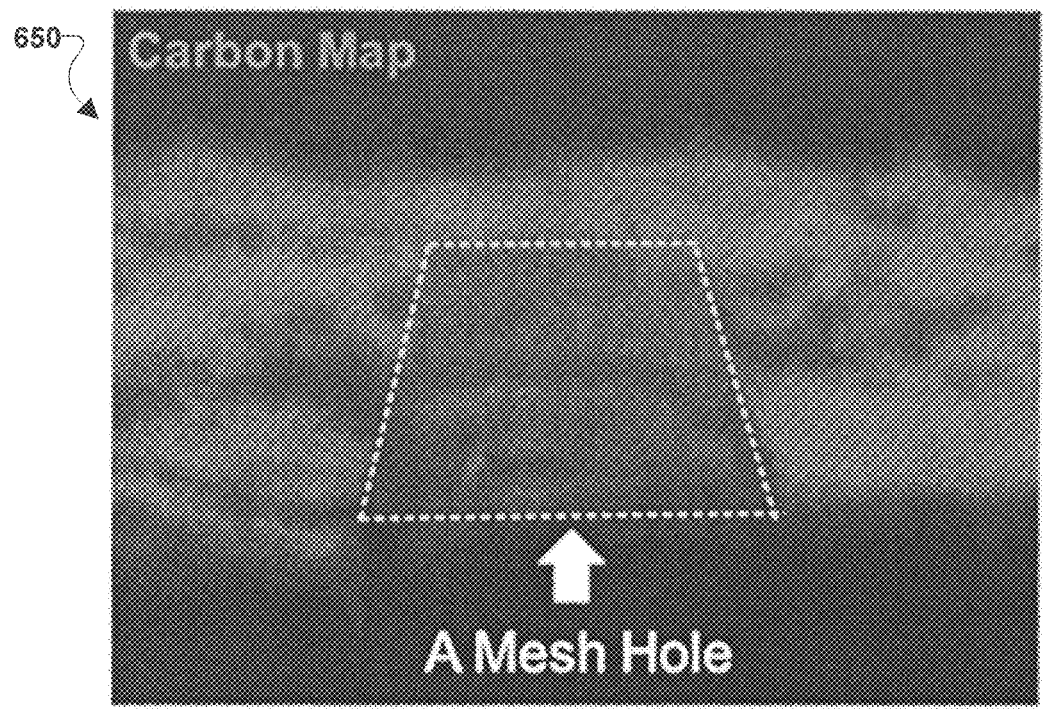
FIG. 6B is an energy dispersive X-ray spectral map of a Ru-HGM composite disc prepared according to the method illustrated in FIG. 6A.
Figure 6B:
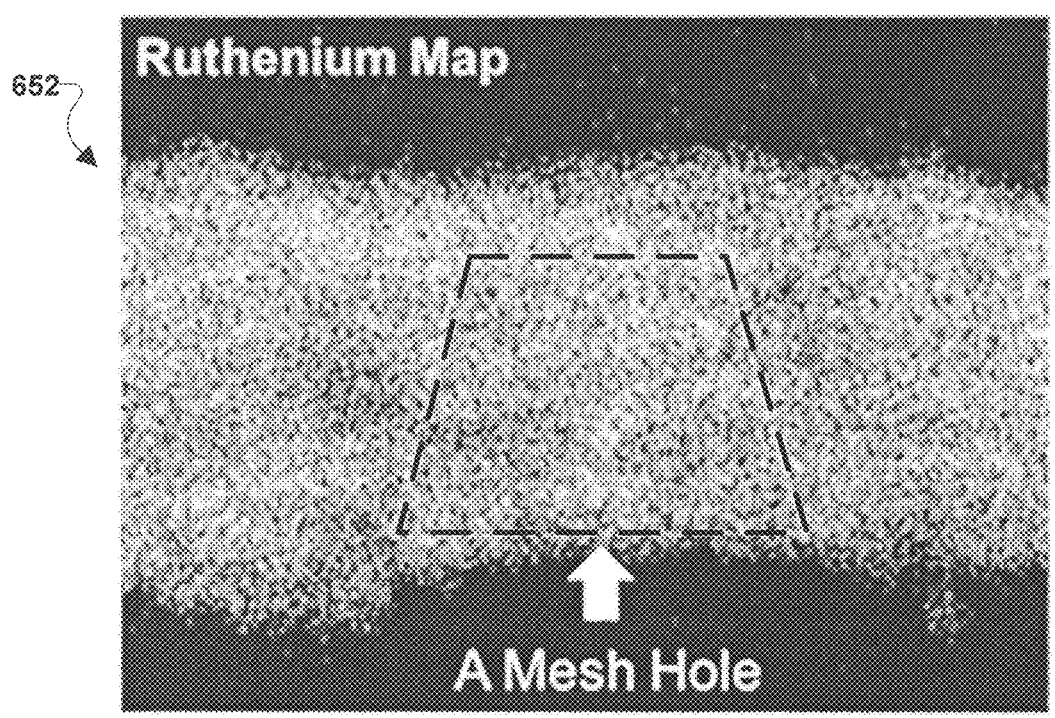

FIG. 6B shows energy dispersive X-ray spectral mapping data of a Ru-HGM composite disc prepared according to the method 600 illustrated in FIG. 6A. The top image 650 is a carbon element map and the bottom image 652 is a ruthenium element map of the Ru-HGM composite disc.

With the robust ultra-lightweight macroscopic mesh framework that is integrated with unique micro-/mesoporous morphology of holey graphene nanosheets, HGM and its composites have a variety of potential applications such as electrodes for energy conversion and storage (including, but not limited to, super capacitors/ultra capacitors/pseudo capacitors, lithium ion batteries, lithium-sulfur batteries, lithium-air batteries, lithium-carbon dioxide batteries, other batteries using non-lithium metals, fuel cells, photovoltaics, solar cells), current collectors, heat sinks, optical guides, substrates for catalysts, platforms for antennas and sensors, electromagnetic irradiation shielding, flame retardants, adsorbents, filters, membranes for gas, water, liquid, biological implants, and biological separations.

HGMs of the various embodiments and composites formed from HGMs of the various embodiments can have a multitude of applications, including as energy generation/storage devices such as supercapacitors, ultra capacitors, pseudo capacitors, lithium ion batteries, lithium-sulfur batteries, lithium-air batteries, lithium-carbon dioxide batteries, other batteries using non-lithium metals, fuel cells, photovoltaics, solar cells, etc. HGMs of the various embodiments and composites formed from HGMs of the various embodiments can find use in electrical, thermal, optical, biological, and other applications, such as current collectors, heat sinks, optical guides, substrates for catalysts, platforms for antennas and sensors, electromagnetic irradiation shielding, flame retardants, adsorbents, filters, membranes for gas, water, liquid, biological implants, and biological separations.

Figure 7B:
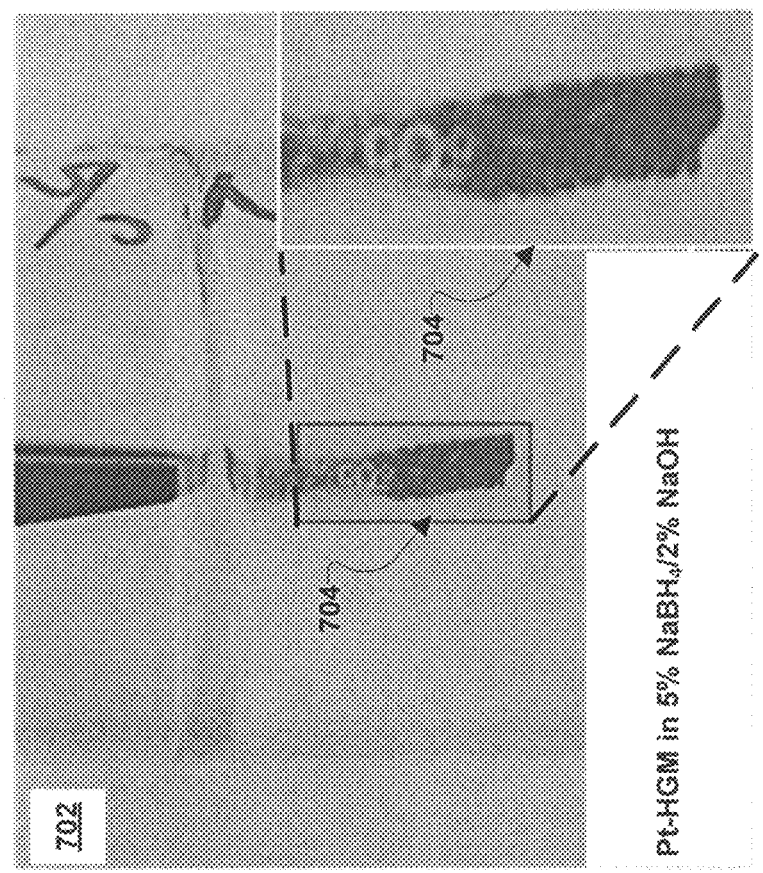
FIG. 7B is a photograph of a platinum (Pt)-HGM composite disc immersed into a 5% sodium borohydride ($NaBH_4$)/2% sodium hydroxide (NaOH) solution, resulting catalytic generation of hydrogen gas bubbles.
Figure 7A:
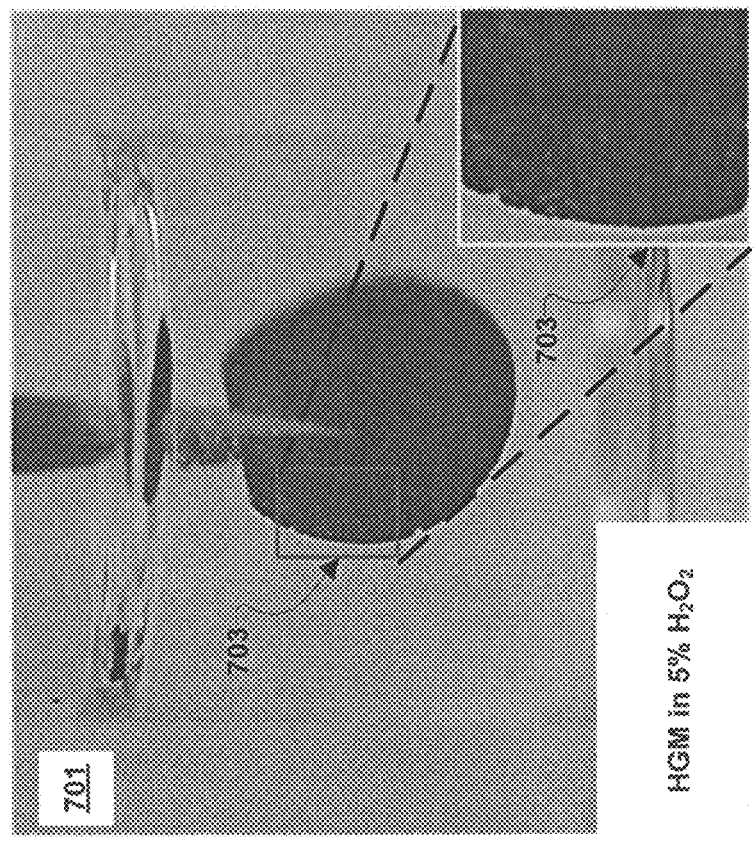
FIG. 7A is a photograph of a HGM disc immersed into a 5% hydrogen peroxide ($H_2O_2$) solution, resulting in catalytic generation of oxygen gas bubbles.

FIGS. 7A and 7B show specific examples of using HGM and HGM composites for catalysis applications. FIG. 7A is a photograph 701 of a HGM disc immersed into a 5% hydrogen peroxide ($H_2O_2$) solution, resulting in catalytic generation of oxygen gas bubbles. Shown overlaid photograph 701 is a zoomed in photograph of a portion 703 of the HGM disc. FIG. 7B is a photograph 702 of a platinum (Pt)-HGM composite disc immersed into a 5% sodium borohydride ($NaBH_4$)/2% sodium hydroxide (NaOH) solution, resulting catalytic generation of hydrogen gas bubbles. Shown overlaid photograph 702 is a zoomed in photograph of a portion 704 of the HGM disc.

The preceding description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments can be performed in any order. Words such as "thereafter." "then." "next," etc. are not intended to limit the order of the operations; these words are simply used to guide the reader through the description of the methods. Further, the terms "first," "second," and the like herein do not denote any order, quantity, or importance, but rather are used to distinguish one element from another.

The modifier "about" used in connection with a quantity is inclusive of the stated value and has the meaning dictated by the context (e.g., it includes the degree of error associated with measurement of the particular quantity).

Reference throughout the specification to "another embodiment", "an embodiment". "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for solvent-free manufacturing, comprising:
   providing a holey graphene article; and
   forming a selected pattern array of holes of a selected shape in the holey graphene article without the use of a solvent to create a holey graphene mesh.

2. The method of claim 1, wherein the holey graphene article is comprised of holey graphene and at least one other material.

3. The method of claim 2, wherein the other material is Ruthenium, Platinum, Ferric Oxide, Titanium Dioxide, Silicon, or Epoxy.

4. The method of claim 1, wherein the selected pattern array of holes results in a hole density of at least 20% in the holey graphene mesh.

5. The method of claim 1, wherein selected shape is circular or square.

6. The method of claim 5, wherein the selected pattern array of holes is such that each of the array of holes has a diameter of about 114 μm and a center-to-center hole distance of about 310 μm.

7. The method of claim 1, further comprising adding at least one additional material to the holey graphene mesh.

8. The method of claim 7, wherein the additional material is Ruthenium, Platinum, Ferric Oxide, Titanium Dioxide, Silicon, or Epoxy.

* * * * *